No. 621,075. Patented Mar. 14, 1899.
T. H. HABERKORN.
AIR STRAINER AND DIRT EJECTOR FOR AIR BRAKE MECHANISM.
(Application filed Dec. 31, 1897.)
(No Model.) 2 Sheets—Sheet 1.
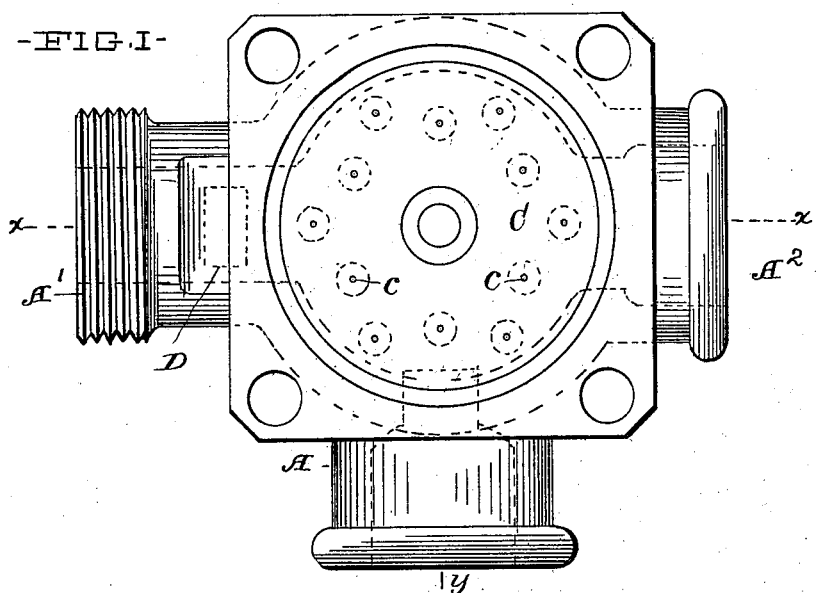
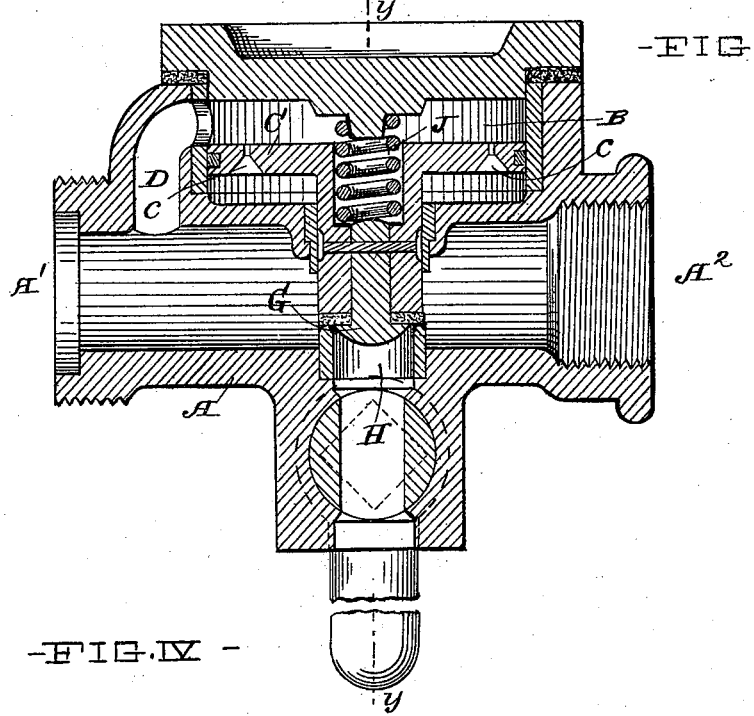
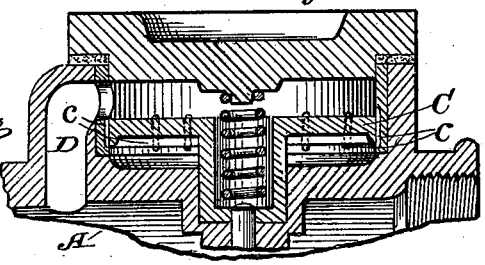
WITNESSES:
INVENTOR
Theodore H. Haberkorn
BY
ATTORNEYS.

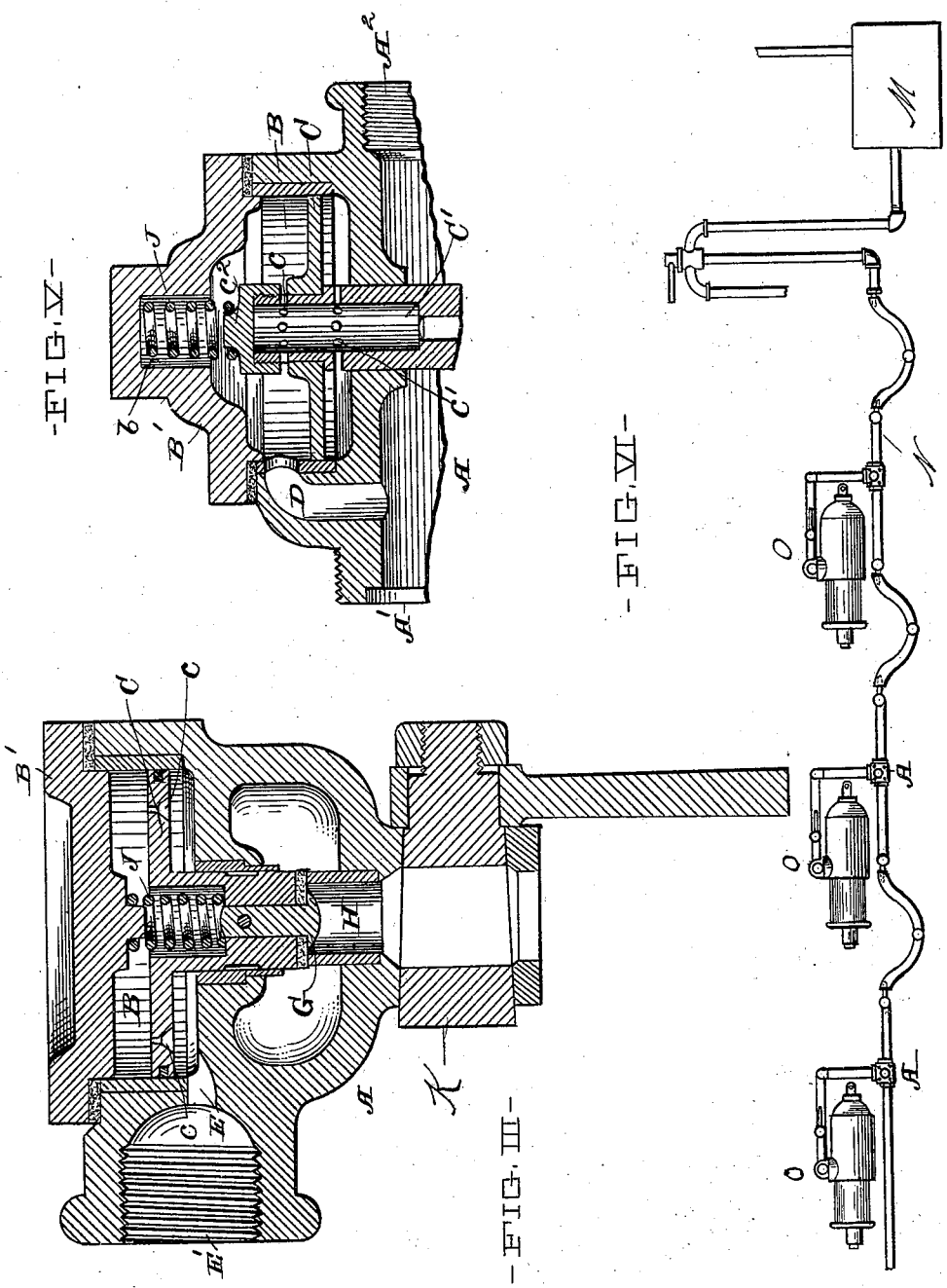

UNITED STATES PATENT OFFICE.

THEODORE H. HABERKORN, OF FORT WAYNE, INDIANA.

AIR-STRAINER AND DIRT-EJECTOR FOR AIR-BRAKE MECHANISM.

SPECIFICATION forming part of Letters Patent No. 621,075, dated March 14, 1899.

Application filed December 31, 1897. Serial No. 664,850. (No model.)

*To all whom it may concern:*

Be it known that I, THEODORE H. HABERKORN, of Fort Wayne, in the county of Allen and State of Indiana, have invented certain new and useful Improvements in Air-Strainers and Dirt-Ejectors for Air-Brake Mechanism; and I do hereby declare the following to be a full, clear, and exact description of the invention, such as will enable others skilled in the art to which it pertains to make and use the same.

My invention relates to automatic air-strainers and dirt-ejectors for use in connection with air-brake mechanism.

The object of my invention is to prevent foreign matter from passing from the main air-pipe to the delicate parts of the brake-controlling valve, known as the "triple valve," which foreign matter interferes with the operation of the brake mechanism, inasmuch as it clogs the action of the parts by working in between the valves and their seats and also between the other movable parts and bearings of the valve mechanism, and another object is to dispose of the collected foreign matter.

It is well known that more or less sand, cinders, scale, or rust will accumulate in the main air-pipe of a train, and hence stationary strainers have been used between the said main air-pipe and the triple-valve mechanism to prevent the said foreign matter from entering the delicate mechanism of said valve; but by the use of the said stationary strainer while it prevented the foreign matter from entering the valve it became clogged, inasmuch as no means were provided for disposing of the collected matter, and thus the operativeness of the brake mechanism was impaired and the device rendered useless, and hence it will be seen that it is necessary that the foreign matter collected by the strainer be disposed of before it has clogged the strainer.

By the use of a strainer constructed according to my invention the air is not only separated from foreign matter and delivered clean to the brake-operating mechanism, but the foreign matter collected or separated by the strainer is automatically disposed of and the strainer-plate cleaned. By my device the dirt or foreign matter lodged in the main air-pipe is also blown out and disposed of.

In the drawings, Figure I is a top plan view of an air-strainer with top removed, illustrating my invention and showing the strainer disk or plate. Fig. II is a vertical longitudinal sectional view taken on line $x$ $x$, Fig. I. Fig. III is a transverse sectional view taken on line $y$ $y$, Fig. II. Figs. IV and V illustrate in section modified forms of strainers embodying my invention. Fig. VI illustrates the preferred location of the strainer in relation to the main air-pipe and the brake mechanism.

In the construction illustrated in the drawings, A represents a chambered casing, preferably formed as illustrated in Figs. I and II and shaped like a T-coupling. The branches $A'$ and $A^2$ of the casing A are adapted for connection in the main-air-pipe line, as illustrated in Fig. VI, one branch $A'$ being provided with a male screw-thread and the other or opposite branch $A^2$ being furnished with an internally-screw-threaded socket.

B represents the strainer, which is provided with a removable lid or cover, and C represents a strainer-piston operating in chamber B. The piston C acts as a movable diaphragm between the upper and lower portions of the chamber B.

D represents a port leading from the main-air-pipe connection to the upper part of chamber B. (See Figs. II, IV, and V.) This port D acts as an air-supply port from the main air-pipe to the strainer.

E represents a port leading from the lower part of the chamber B through suitable connections, as $E'$, to the valve-operating mechanism of the brake-cylinder, known as the "triple valve." This port E is illustrated in Fig. III of the drawings, and it is through this port E that the air is supplied to the valve mechanism and thence to the brake-cylinder. It will be seen that the air in order to pass from the main air-pipe to the brake mechanism and cylinder must pass from the upper part of cylinder B to the lower part, and hence must pass the piston C. In order to allow of the air passing the piston C, I have illustrated three methods or constructions, either of them being operated, primarily, by the movement of the piston C, and thus controlled by the air-pressure, as will be hereinafter explained.

In Figs. I, II, and III, I have shown the piston C provided with small perforations $c$ $c$, which allow the air to pass, but at the same time strain it during its passage, thus freeing the air from foreign matter, which foreign matter is collected above the piston C into the upper part of cylinder B.

In Fig. IV, I have shown the side of the cylinder provided with small grooves or ports $c$ $c$, which are controlled by the movement of the piston C and allow the air to pass and at the same time strain it or separate the foreign matter from it and collecting the foreign matter above the piston C and into the upper part of the cylinder B.

Fig. V illustrates a construction wherein the piston C is supported by and vertically movable on its hollow stem C'. The hollow stem C' is provided with two rows of small holes $c$ $c'$. The upper row of holes $c$ communicates with the upper part of chamber B and is controlled by the vertical movement of the piston C. The lower row of holes $c'$ communicates with the lower part of chamber B and is always open. The holes $c$ and $c'$ communicate with each other through the hollow stem C'. It will be seen that by this construction the air is also freed from foreign matter and the foreign matter collected above the piston C.

G represents a valve located on the lower end of the piston-stem C'. The valve G controls the opening and closing of a port H, which leads out to the open air, the valve G in turn being controlled in its movement by the movement of the strainer-piston C.

J represents a spiral spring which is located between the cover B and the piston C, being preferably seated at its lower end, as illustrated in Figs. II, III, and IV, in the hollow at the upper end of stem C. As shown in Fig. V, the cover B' is provided with a recess $b$, in which the upper end of spring J rests and is retained, and the stem C' is provided with a cap $c^2$, the upper end of which forms a seat for the lower end of spring J. The function of the spring J is to keep the valve G normally closed and to also act as a cushion when the piston C is projected upward.

K represents a one-way plug-valve, which is provided to control the port H when from any cause the valve G should not work or close the said port H.

The operation of my strainer and dirt-ejector is as follows: Air under pressure is admitted from the main reservoir M to the main or train pipe N and passes from thence through port D to the upper part of chamber B and through perforations, grooves, or ports $c$ to the lower part of chamber B. As the air passes through the perforations, grooves, or ports $c$ the foreign matter is retained or intercepted. The compressed air then passes through port E to the triple valve or brake mechanism O. When it is desired to remove the foreign matter collected in the strainer and main air-pipe from the same, the air-pressure in the main pipe is suddenly reduced, thus causing the back pressure from the branch pipe or the pressure underneath the piston C to elevate or raise said piston quickly and with sufficient force to cause the piston to come in contact with the upper end or top of the chamber B, and thus the foreign matter which may be collected on the strainer-piston C is loosened therefrom, and inasmuch as this action also raises the piston C, so as to open communication between port D and that portion of the chamber B which is beneath the said piston, the air forces itself out through port D and carries with it the dirt or foreign matter which is loosened from the piston C and also any that may be collected in the upper part of chamber B. The raising of piston C, as just above described, acts through hollow stem C' to open the valve G, and thus allows the dirt-charged air to escape from the strainer and main air-pipe through port H into the open air. The opening of the valve G also acts to again reduce the pressure in the main air-pipe M suddenly, and thus all the strainers are actuated throughout the train one after the other.

I have found that by use of my strainer a very harmonious and almost simultaneous action is obtained in the brake system of a long train when the air is reduced in the main air-pipe M for the purpose of operating the brake mechanism. After having operated as above set forth to eject the dirt or foreign matter the operative parts of the apparatus resume their normal position (that position illustrated in Figs. II and III) as follows:

As hereinbefore set forth, the upward movement of the piston C opens communication between the branch pipe and the main air-pipe M through port D, allowing the back air-pressure to escape from the branch pipe to the main pipe, and thus establish an equilibrium between the air in the branch pipe leading to the brake mechanism and the air in the main pipe. This allows the gravity of the piston C, assisted by spring J, to force the piston C down and close the valve G, and at the same time in the constructions illustrated in Figs. IV and V the ports or grooves $c$ are opened and communication is established between the upper part and the lower part of chamber B, and hence between the main air-pipe M and the branch pipe.

While I have shown and described two or more constructions adapted to operate according to and embodied by my invention, still I do not wish to be understood as confining my invention to the construction shown and described or to the location of the strainer in relation to the main pipe and the brake mechanism, it being only essential that the strainer be so located in relation to these parts as to intercept the foreign matter before it has reached the delicate mechanism of the brake-controlling valve or triple valve and discharge the foreign matter, as set forth.

What I claim is—

1. An air-strainer for air-brake systems, consisting of a piston operated by air-pressure located in the line of air communication, between the main air-supply and the valve mechanism directly controlling the air-supply to the brake-cylinder, said piston being provided with straining-ports and acting as a diaphragm interposed to cut off the direct supply of air, thus causing the air to pass through said ports before passing to the said valve mechanism in combination with a valve connected to and operated by the piston, substantially as and for the purpose shown and described.

2. An air-strainer for air-brake systems consisting of a piston operated by air-pressure in combination with a valve connected to and operated by the piston, said piston being interposed in the line of air communication between the main air-supply and the air-brake mechanism *per se*, whereby the air is caused to pass through suitable straining openings or ports before being delivered to said air-brake mechanism, substantially as and for the purpose shown and described.

3. In an air-strainer for air-brake systems, the combination with the main air-pipe, of a strainer located in the line of air-supply and between the main air-pipe and the brake-cylinder, said strainer provided with a movable piston or diaphragm also interposed in the main air-supply and having ports for the air, a valve located in the main air-line and operated by the piston, said piston or diaphragm acting by the sudden reduction of the pressure in the main air-pipe to loosen the foreign matter or substances and cause them to be ejected into the open air, substantially as and for the purpose shown and described.

In testimony whereof I sign this specification, in the presence of two witnesses, this 14th day of October, 1897.

THEODORE H. HABERKORN.

Witnesses:
LINDLEY M. NINDE,
ELIZABETH C. LINCOLN.